US012774631B2

(12) United States Patent
Seppanen et al.

(10) Patent No.: US 12,774,631 B2
(45) Date of Patent: Oct. 27, 2026

(54) METHOD AND APPARATUS FOR DOOR FRAME INSTALLATION

(71) Applicant: KMH INDUSTRIES INC., Thunder Bay (CA)

(72) Inventors: Marko Seppanen, Thunder Bay (CA); William Brown, Thunder Bay (CA); Brad Ruhl, Thunder Bay (CA); Zakari Seppanen, Thunder Bay (CA)

(73) Assignee: KMH INDUSTRIES INC., Thunder Bay (CA)

( * ) Notice: Subject to any disclaimer, the term of this patent is extended or adjusted under 35 U.S.C. 154(b) by 413 days.

(21) Appl. No.: 18/196,265

(22) Filed: May 11, 2023

(65) Prior Publication Data

US 2023/0366256 A1 Nov. 16, 2023

Related U.S. Application Data

(60) Provisional application No. 63/341,836, filed on May 13, 2022.

(51) Int. Cl.
*E06B 1/52* (2006.01)
*E06B 1/34* (2006.01)
*E06B 1/60* (2006.01)

(52) U.S. Cl.
CPC .................. *E06B 1/52* (2013.01); *E06B 1/34* (2013.01); *E06B 1/603* (2013.01)

(58) Field of Classification Search
CPC ............... E06B 1/52; E06B 1/34; E06B 1/603
See application file for complete search history.

(56) References Cited

U.S. PATENT DOCUMENTS 1,926,673 A * 9/1933 Gregg ..................... E06B 1/603 52/214
1,966,666 A * 7/1934 Grimes ..................... E06B 1/18 52/213
2,730,773 A * 1/1956 Glenn ................... E06B 1/6076 49/505
2,913,777 A * 11/1959 Charles ................. E06B 3/9885 52/211
3,007,559 A 11/1961 Goldgerg
3,107,759 A * 10/1963 Day .......................... E06B 1/52 D25/60

(Continued)

FOREIGN PATENT DOCUMENTS

AU 774127 B2 10/2000
DE 2451813 A1 5/1976

OTHER PUBLICATIONS

Technical Data Series, SDI 122-2015, "Installation Troubleshooting Guide for Standard Steel Doors and Frames", Steel Door Institute.

*Primary Examiner* — Brian E Glessner

(57) ABSTRACT

A door framing assembly comprises trim pieces for overlying a wall to conceal a rough opening. The trim pieces are held together using a plurality of brackets positioned along an axis of the trim pieces. The brackets hold the trim pieces in opposed, spaced apart relationship. The brackets have holes for securing to framing members defining the rough opening. A pocket is defined between the trim pieces for reception of a jamb. Flanges of the brackets are received in slots of the trim pieces, allowing pivoting of the trim pieces to fit tightly against the wall.

16 Claims, 16 Drawing Sheets

(56) References Cited

U.S. PATENT DOCUMENTS 3,224,152 A * 12/1965 Evans ................... E06B 1/6076 52/211
3,250,049 A * 5/1966 Sklar ..................... E06B 1/6061 52/211
3,585,770 A * 6/1971 Maizler ................. E06B 1/6061 403/231
3,690,082 A * 9/1972 Byland ..................... E06B 1/18 52/213
3,788,019 A * 1/1974 Kiselewski ........... E06B 1/6023 52/214
3,808,759 A * 5/1974 Carmichael ............... E06B 1/10 49/505
4,014,146 A * 3/1977 DiMascio ............. E06B 1/6015 52/211
4,223,494 A * 9/1980 Wendt ....................... E06B 1/32 49/504
4,281,480 A * 8/1981 Wendt ....................... E06B 1/34 49/504
4,513,549 A * 4/1985 Wendt ....................... E06B 1/34 52/211
4,986,034 A * 1/1991 Mozuras ................... E06B 1/20 49/505
4,993,764 A * 2/1991 Barker ...................... E06B 1/52 52/211
5,038,538 A * 8/1991 Rozon ..................... E06B 1/526 52/509
5,154,019 A * 10/1992 Day ...................... E06B 1/6076 49/504
5,771,644 A 6/1998 Kidd
6,192,638 B1 * 2/2001 Wang ........................ E06B 1/10 49/504
6,588,159 B1 * 7/2003 Cotton, Jr. ............ E06B 1/6015 49/504
7,856,760 B2 12/2010 Klingbyle
8,850,762 B2 * 10/2014 Knauf ....................... E06B 1/52 52/212
9,194,170 B2 11/2015 Eis et al.
9,803,352 B2 10/2017 Gosling et al.
10,465,432 B1 * 11/2019 Brannon ............... E06B 1/6076
2014/0075861 A1 * 3/2014 Knauf ....................... E04H 1/06 52/204.2
2014/0230351 A1 * 8/2014 Andres ................... E04F 19/02 52/211

* cited by examiner

METHOD AND APPARATUS FOR DOOR FRAME INSTALLATION

RELATED APPLICATIONS

This application claims priority to U.S. provisional patent application No. 63/341,836 filed May 13, 2022, the entire contents of which are incorporated herein by reference.

FIELD

This relates to construction, and particularly to installation of door frames and trim.

BACKGROUND

Typical doors are installed or "hung" from hinges attached to a jamb of a door frame. For proper operation of the door, the frame and the door itself should be plumb and square. That is, the door jambs should be oriented vertically, and header and jamb components of the frame should be perpendicular to one another.

Generally, doors are installed to openings defined in walls. The openings typically are not finished, and may be referred to as "roughed-in" or "rough openings". The margins of such rough openings may not be perfectly plumb or square. The sides of a rough opening may be inclined at an angle to the vertical, and the top and bottom may be at an angle to the horizontal.

Installation of doors therefore typically requires adjusting the alignment of the door frame relative to the rough opening in which the frame is located. Such adjusting is time-consuming and relies on specialized skills and experience of the installer. Moreover, trim may need to be installed in order to conceal the rough opening. Adjustment of the door frame is typically not possible once trim is installed. Accordingly, trim is generally installed manually after adjustment of the frame, which is labour-intensive and time-consuming.

SUMMARY

An example door framing assembly for installation to a rough door opening in a wall comprises: a plurality of trim pieces for overlying said wall to conceal edges of said rough opening; a frame comprising: a plurality of brackets positioned along an axis of said trim pieces and holding said trim pieces in opposed, spaced apart relationship defining a pocket for reception of a jamb, said each of said brackets having a hole sized for receiving a shaft of a fastener; flanges received in corresponding slots of said trim pieces, such that each of said trim pieces is retained to said frame and pivotable around said flanges toward said wall.

An example door framing method, comprises: attaching a frame to a rough opening in a wall by driving fasteners through brackets of said frame, said frame having attached trim pieces for overlying said wall; pivoting said trim pieces toward said wall about said frame; and attaching a jamb to said brackets.

BRIEF DESCRIPTION OF DRAWINGS

In the drawings, which depict example embodiments.

DETAILED DESCRIPTION

Figure 1:
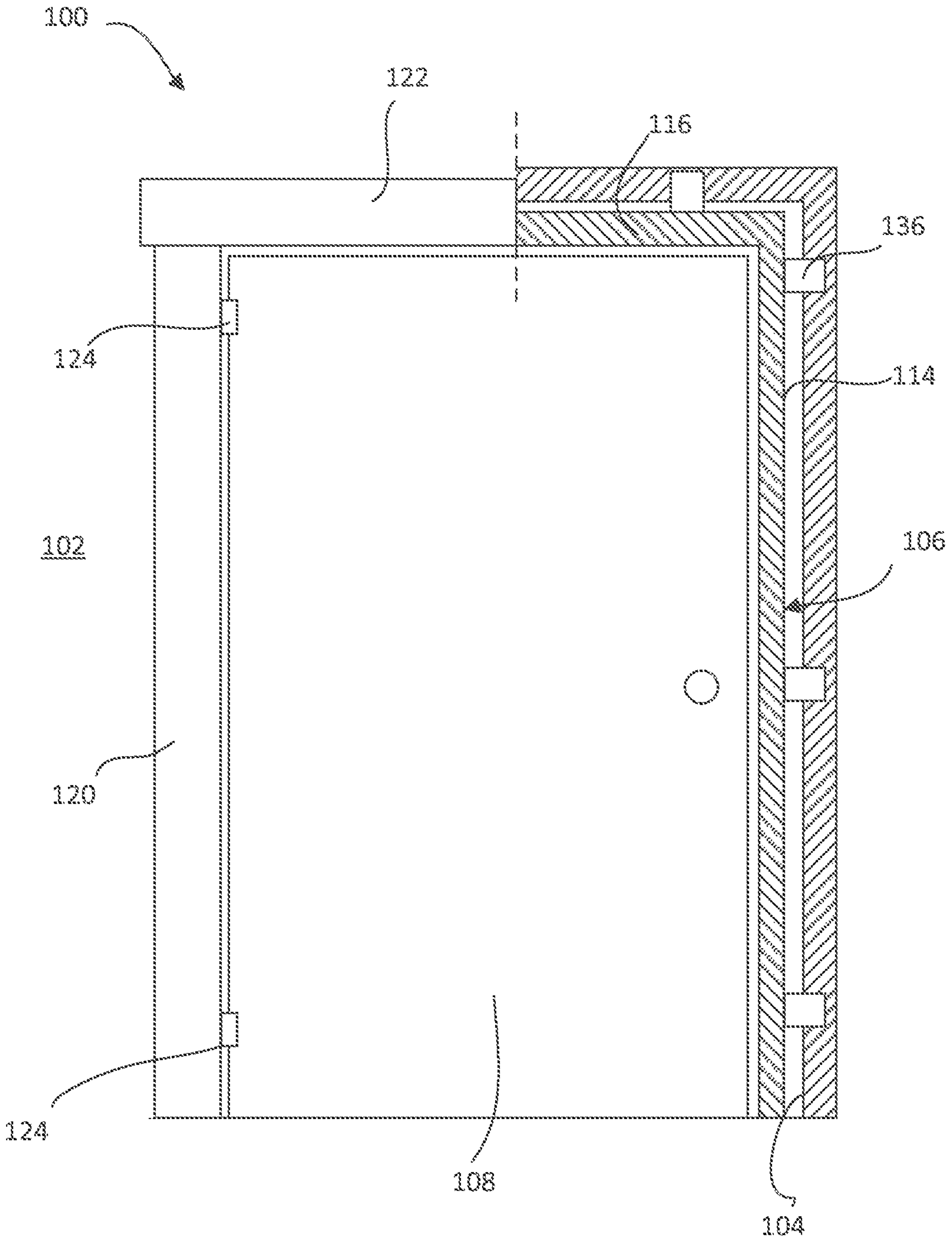
FIG. 1 is a schematic view of a door and door frame in a wall.
Figure 3A:
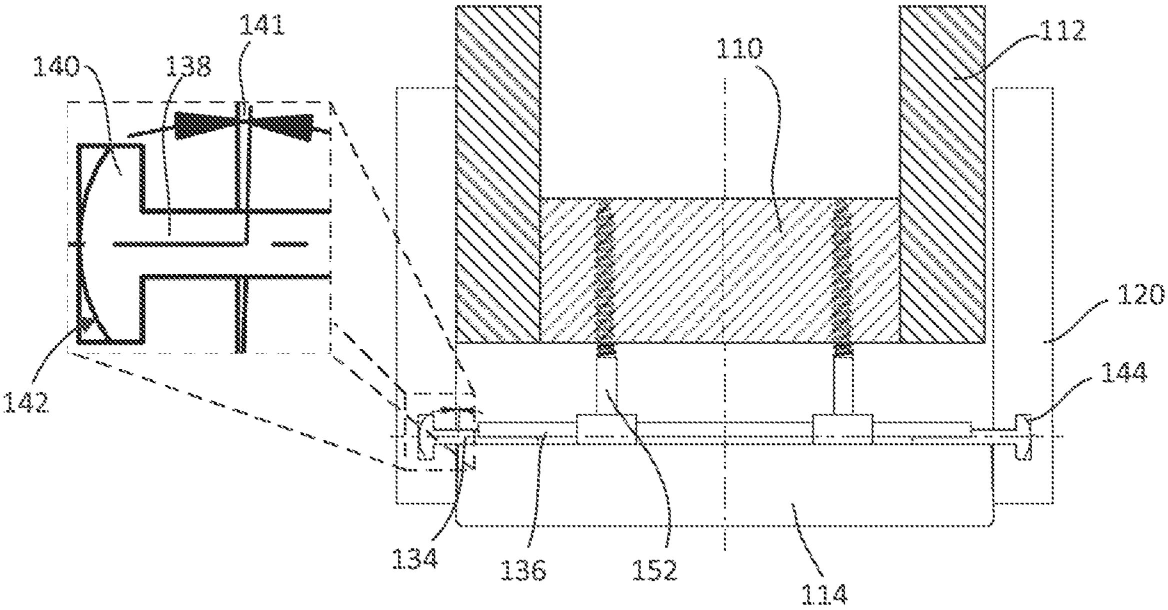
FIG. 3A is a cross-sectional view of a portion of the door frame assembly of FIG. 2B, taken at section line III-III.
Figure 3B:
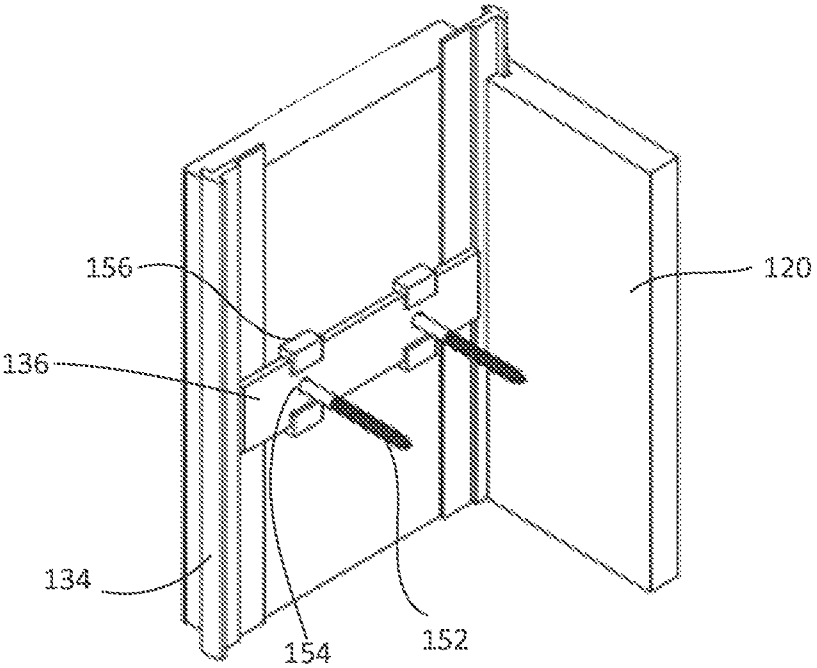
FIG. 3B is a rear isometric view of the door frame assembly of FIG. 2A, with trim omitted.

FIG. 1 depicts an example door assembly 100. Door assembly 100 is installed in an interior wall 102 of a building. Portions of interior wall 102 and trim are cut away to show details of wall and door assembly construction. In the depicted example, interior wall 102 is of stud-and-drywall construction, including framing members 110 such as studs, and sheets of drywall 112 mounted to framing members 110 (as shown in FIG. 3A). However, the present disclosure is applicable to other types of wall construction. Moreover, although the wall 102 is an interior wall, the present disclosure is applicable to exterior walls and doors.

Interior wall 102 defines a rough opening 104 into which a doorframe 106 and door 108 are installed. In particular, framing members 110 of wall 102 define the rough opening. Doorframe 106 is defined by two vertical jambs 114 and a horizontal jamb 116, also referred to as a header. The doorframe 106 is attached to framing members 110 of the rough opening 104 using a series of brackets 136 with fasteners such as screws.

Door assembly 100 includes trim components to conceal rough opening 104 and provide a desired appearance for the installed assembly. The trim components include jamb casing trim 120 which overlies jambs 114 and header casing trim 122 which overlies header 116. In a typical installation, trim 120, 122 is sufficiently wide to cover jambs 114, 116 and to conceal the edge of rough opening 104. Trim 120, 122 overlies the surface of wall 102. Generally, perceived quality depends on the size of gaps between trim 120, 122 and wall 102, and on the straightness of the edges of trim 120, 122. Accordingly, it is desired to limit such gaps, and to limit deviation of jamb trim 120 from vertical, and deviation of header trim 122 from horizontal.

Door 108 is mounted to doorframe 106 at hinges 124, so that the door can pivot around an axis defined by the hinges. For smooth operation of the door and to achieve a desirable appearance, hinges 124 are preferably aligned with one another so that the axis is vertical. Accordingly, jambs 114 are installed to minimize deviation from vertical orientation. Likewise, header 116 is installed to minimize deviation from horizontal orientation.

Rough opening 104 defined by framing members 110 may not be perfectly rectangular. That is, the framing members 110 and drywall 112 defining lateral edges of the rough opening 104 are not perfectly vertical. Likewise, framing member 110 and drywall 112 defining the top edge of the rough opening 104 are not perfectly horizontal. Doorframe 106 is installed to compensate for such deviations.

Figure 2A:
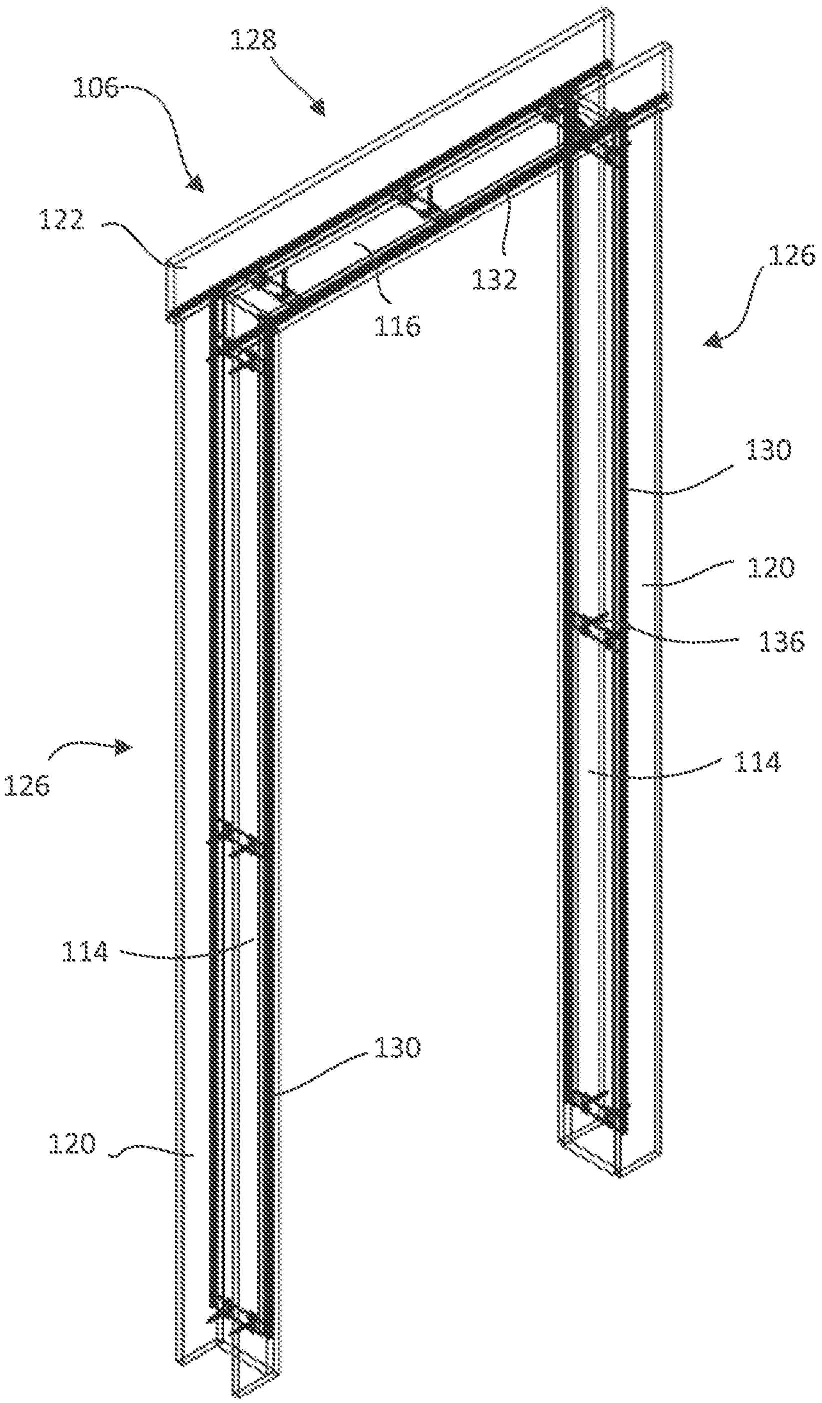
FIG. 2A is an isometric view of a door frame assembly, with trim shown as transparent.
Figure 2C:
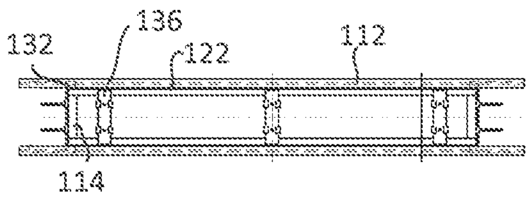
FIG. 2C is a top view of the door frame assembly of FIG. 2A.
Figure 2B:
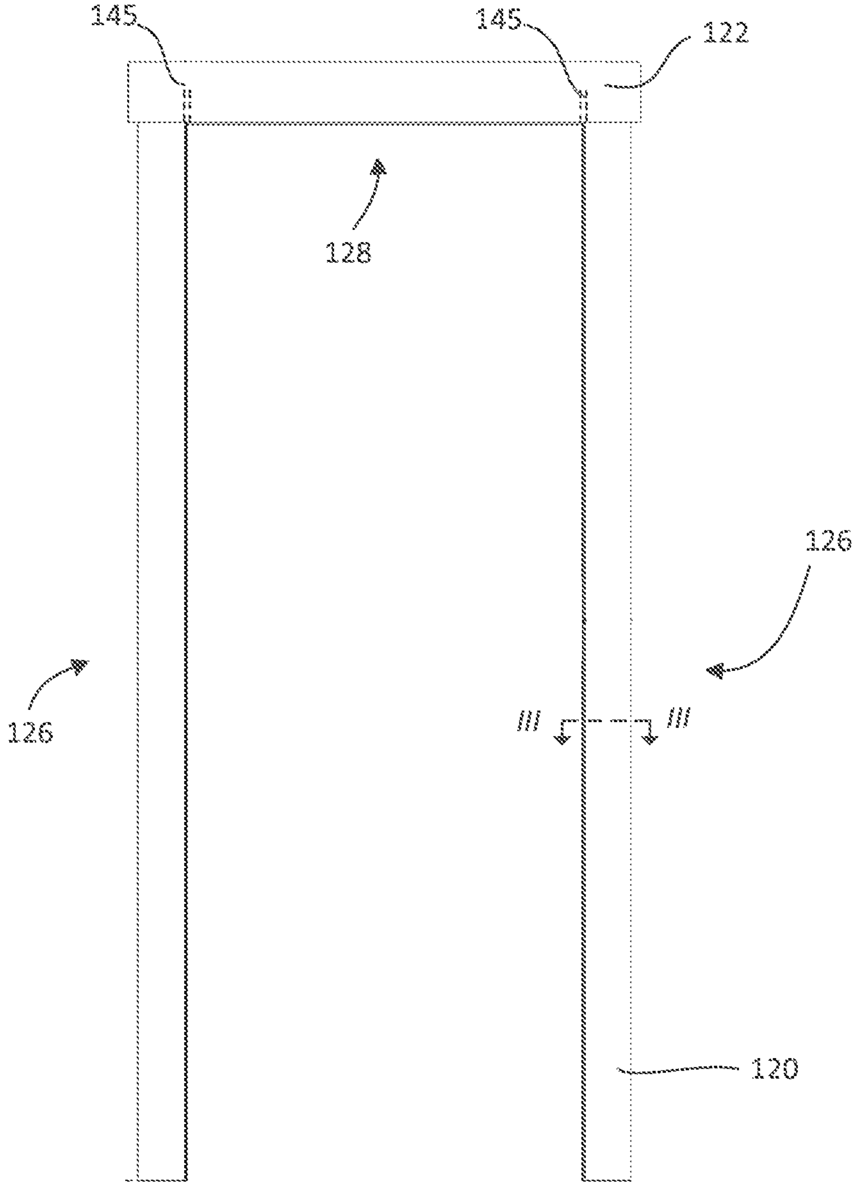
FIG. 2B is a front view of the door frame assembly of FIG. 2A.

FIGS. 2A, 2B and 2C are isometric, front and top views, respectively, of doorframe 106, showing details of the doorframe's construction. Jamb trim 120 and header trim 122 are shown as transparent in FIG. 2A to show internal details.

Doorframe 106 includes two jamb assemblies 126-1, 126-2 (individually and collectively, jamb assembly 126) and a header assembly 128, each of which includes a frame assembly. Each jamb assembly 126 includes a strike jamb 114-1 or a hinge jamb 114-2 (individually and collectively, jamb 114) and opposing pieces of jamb casing trim 120. The jamb 114 and trim 120 are mounted to a frame 130. Header assembly 128 includes header 116 and opposing pieces of trim 122. Header 116 and trim 122 are mounted to a header frame 132.

As depicted, each one of frames 130, 132 includes brackets 136 with flanged ends to engage and retain the brackets and trim to one another. In the depicted embodiment, the flanged ends are provided by a pair of opposed posts 134. As will be described in greater detail, each trim piece 120, 122 is mounted to a respective post 134. The posts are held in a parallel, spaced apart relationship by the brackets 136. Brackets 136 allow for mounting of the frame 130, 132 to the framing members 110 of wall 102. Brackets 136 are adjustable, such that the distance between the frame 130, 132 and the framing member 110 at the position of each bracket can be increased or decreased.

FIG. 3A is a cross-sectional view of a jamb assembly 126, taken at section line III-III shown in FIG. 2B.

As shown in FIG. 3A, each bracket 136 is joined to posts 134. Brackets 136 may, for example, be welded, pressed or crimped to posts 134. Alternatively or additionally, brackets 136 and posts 134 may be joined using suitable fasteners such as bolts, rivets, double sided tape or brackets 136 and posts 134 may be integrally formed as a single unit, e.g., by casting or injection molding. The brackets maintain trim pieces 120 in a fixed spatial relationship. That is, the brackets hold trim pieces 120 at a defined spacing from one another.

In some embodiments, posts 134 and brackets 136 may be fabricated in fixed (e.g., standardized) sizes. For example, posts and brackets 134, 136 may be fabricated to correspond to standard-sized door openings, and to hold posts 134 at a spacing that corresponds to common wall construction. In the depicted embodiment, brackets 136 hold posts 134 such that the opposing surfaces of trim pieces 120 mounted to the posts are spaced apart by a distance w. As shown, the distance w corresponds to the combined thickness of a standard 2"×4" framing member, plus two sheets of ½" thick drywall. However, as will be apparent, other standard spacings are possible, including spacings corresponding to other common wall construction types.

In some embodiments, brackets 136 may allow for adjustment of spacing of posts 134. For example, brackets 136 may be joined to posts 134 via fasteners, which may be received in a slot in the brackets, such that the brackets are slidable relative to the fasteners before the fasteners are fully tightened.

As shown in FIG. 3A, each post 134 has a generally T-shaped cross-section, including a web section 138 and flanges 140. In the depicted embodiment, each post 134 has a curved outer surface 142.

Each of trim pieces 120 has an internal slot 144. Slots 144 may, for example, be routed into trim pieces 120 and extend substantially along the entire height of trim pieces 120. Slots 144 are sized and shaped to receive posts 134. Specifically, in the depicted embodiment, slots 144 are generally complementary to the cross-sectional shape of posts 134, except that some clearance is provided between curved surface 142 trim piece 120, as shown by relief angle 141. Such clearance allows each trim piece 120 to pivot slightly around its respective post 134. In the depicted embodiment, the relief angle is 1.63 degrees. However, the relief angle may be larger or smaller. For example, in some embodiments, sufficient clearance may be provided to allow trim piece 120 to pivot between 0-5 degrees around post 134. When mounted to posts 134, outer portions 146 of trim pieces 120 extend from posts 134 in a direction away from rough opening 104 and overlie wall 102. Inner portions 148 of trim pieces 120 extend from posts 134 into rough opening 104. A pocket 150 is defined by inner portions 148 of trim pieces 120. Jamb 114 may be received in pocket 150 so that the jamb abuts bracket 136. Jamb 114 may be fixed to bracket 136, e.g. using suitable fasteners or adhesive.

As depicted, one or more fasteners 152 may be used to fix bracket 136 to framing member 110 of wall 102. Specifically, fasteners 152 may be received through holes 154 in brackets 136 and driven into framing member 110. In the depicted embodiment, each bracket 136 has two holes 154 to receive two fasteners 152. However, any number of holes and fasteners may be present. The depicted embodiment includes fasteners that are not vertically aligned with one another. That is, the fasteners 152 are offset from one another so that they do not lie on a common vertical axis. Such an arrangement provides stability of doorframe 106. For example, such an arrangement of fasteners may resist twisting and allow brackets 136, jamb 114 and doorframe 106 to be held square, such that an outer surface of the jamb is perpendicular to the plane of the rough opening 104.

Figure 4A:
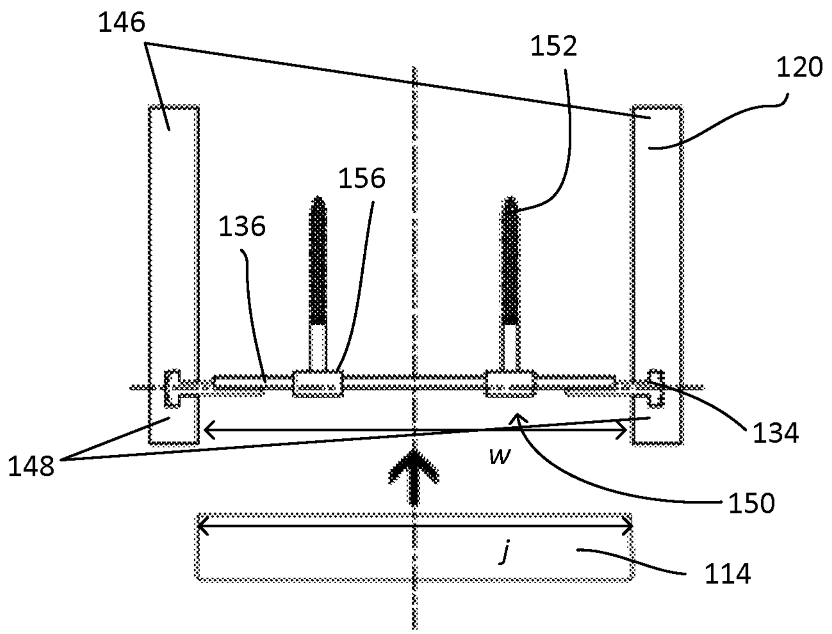
FIG. 4A is a cross-sectional view of the door frame assembly of FIG. 3A, in a partially-assembled state.
Figure 4B:
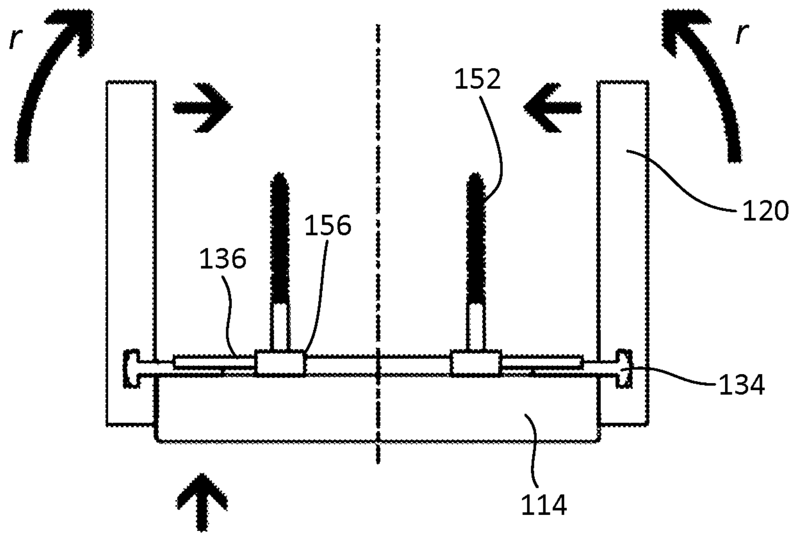
FIG. 4B is a cross-sectional view of the door frame assembly of FIG. 3A, depicting installation of a jamb.

As best shown in FIGS. 4A-4B, jamb 114 is sized for an interference fit between trim pieces 120. Jamb 114 may have a tapered cross-section. At its exterior surface, i.e. the surface facing towards the door, jamb 114 has a width j which is slightly larger than the spacing w between trim pieces 120. Jamb 114 may taper to a smaller width at the opposite surface. In some examples, each side may be tapered by between 1/32 of an inch and ¼ of an inch, such that the width of the jamb 114 at its smallest point is up to ½ of an inch less than the width j at its largest point. Insertion of jamb 114 into pocket 150 causes the jamb to bear against inner portions 148 of trim pieces 120. This in turn causes trim pieces 120 to pivot about posts 134 as shown by arrows r in FIG. 4B, biasing outer portions 146 of trim pieces 120 towards wall 102. Such biasing ensures that trim pieces 120 fit tightly against wall 102. In addition, biasing of trim pieces 120 in this manner may cause the trim pieces 120 to frictionally engage the wall, holding doorframe 106 in place.

Figure 6:
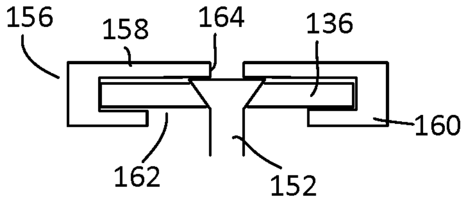
FIG. 6 is an enlarged cross-sectional view of a bracket, retainer and fastener of the bracket assembly of FIG. 5, taken at line VI-VI.

Holes 154 of brackets 136 are dimensioned to receive shafts of fasteners 152, but to prevent heads of fasteners 152 from passing through the holes. For example, holes 154 may be formed with a countersink to mate to fasteners 152, as depicted in FIG. 6.

Figure 5:
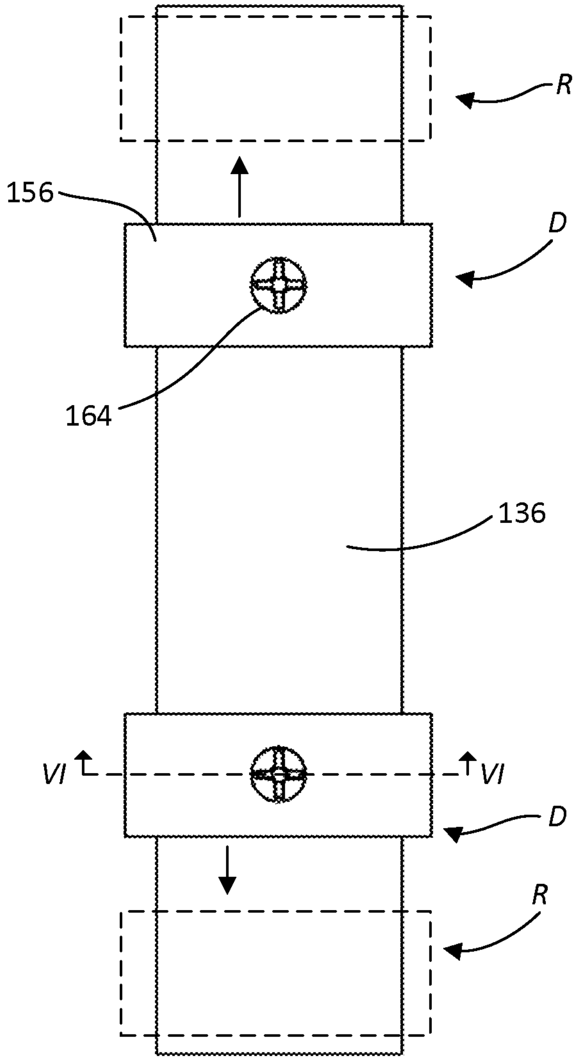
FIG. 5 is an enlarged front view of a bracket assembly of the door frame assembly of FIG. 3A.

Brackets 136 further include retainers 156. FIG. 5 depicts a front view of an example bracket 136 with retainers 156. FIG. 6 depicts a cross-sectional view of the retainer taken at line VI-VI shown in FIG. 5.

As depicted, the retainers 156 are generally C-shaped, including a main body 158 and a pair of flanges 160 defining an internal slot 162. The retainers are dimensioned so that internal slot 162 can receive brackets 136, such that the retainers 156 are slidable along the brackets.

Each retainer 156 includes a fastener access hole 164. Each fastener access hole is smaller than the head of a fastener 152, but large enough to permit manipulation of the fastener through the hole. For example, fastener access holes 164 are large enough that a driver may be inserted through a hole 164 to turn a fastener 152.

As noted, retainers 156 are slidable along brackets 136. For example, each retainer 156 may be moved between a deployed position D, depicted in solid line in FIG. 5, and a retracted position R, depicted in broken line in FIG. 5.

In the deployed position, the fastener access hole 164 of the retainer 156 is aligned with a fastener 152 and hole 154 of bracket 136. With retainer 156 in this position, the fastener 152 is captive between retainer 156 and bracket 136. That is, hole 154 of bracket 136 and access hole 164 of retainer 156 cooperatively prevent axial motion of the fastener 152 relative to bracket 136 and retainer 156. However, the fastener 152 may be rotated using a driver, to drive the fastener into or withdraw the fastener from a framing member 110. Rotation of the fastener 152 in a tightening direction drives the fastener into framing member 110, likewise pulling bracket 136 and retainer 156 towards the framing member. Conversely, rotation of the fastener 152 in a loosening direction withdraws the fastener from the framing member 110, pushing against retainer 156 and urging the retainer and bracket 136 away from framing member 110.

In the retracted position, retainer 156 is clear of fastener 152 and hole 154 of bracket 136. The fastener may therefore be freely withdrawn from the bracket.

As noted, a series of brackets 136 can be used to mount jamb assemblies 126 and header assembly 128 to a framing member 110 of wall 102, and to adjust the jamb and header assemblies to provide a door frame 106 that is square, i.e. having a horizontal header and vertical jambs, and to ensure that each one of jambs 114 and header 116 are square to the frame, i.e., perpendicular to the opening defined by the door frame 106. Such adjustment is depicted schematically in FIGS. 7A-7B.

Figure 7A:
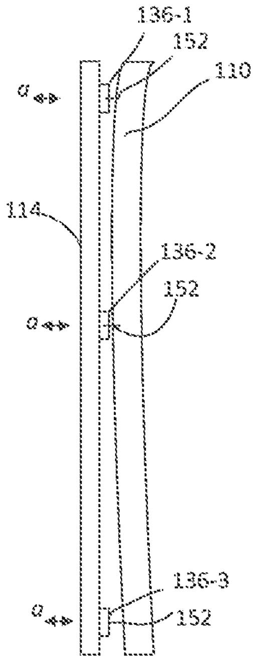
FIG. 7A is a schematic side view depicting adjustment of the door frame assembly of FIG. 2A.

FIG. 7A is a side view of a jamb assembly 126 and framing member 110. Trim pieces 120 are omitted for clarity. In the depicted embodiment, jamb assembly 126 is secured using three brackets 136, which are individually labelled as brackets 136-1, 136-2, 136-3. In other embodiments, more or fewer brackets may be used.

As depicted, framing member 110 is not positioned vertically. Rather, the axis of the framing member deviates from a vertical axis by an angle θ. In addition, framing member 110 is slightly warped along its axis. That is, the middle of the framing member 110 is bowed inwardly (i.e. into opening 104).

Each of brackets 136-1, 136-2, 136-3 is independently adjustable relative to framing member 110. That is, the spacings of bracket 136 from framing member 110 may be adjusted independently of one another as indicated by arrows a.

As depicted, bracket 136-1 proximate the top of jamb assembly 126 is positioned closer to framing member 110 than bracket 136-3 proximate the bottom of jamb assembly 126. Bracket 136-2 proximate the middle of jamb assembly 126 is located adjacent the inward bow of framing member 110 and is positioned closer to the framing member 110 than either of brackets 136-1, 136-3. Jamb 114 is installed tightly against all of brackets 136-1, 136-2, 136-3. The jamb 114 and brackets 136 lie along a vertical axis V.

Adjustment of the positions of brackets 136 is effected as described with reference to FIGS. 5-6. In particular, the jamb assembly 126 is positioned at wall 102, fasteners 152 are inserted through holes 154 and into framing member 110, then retainers 156 are slid into the deployed positions so that the fasteners cannot be withdrawn from brackets 136. The brackets 136 are then individually pulled closer to framing member 110 by driving fasteners 152 into the framing member, or pulled farther from framing member 110 by retracting fasteners 152 from framing member 110. During such adjustment, jamb assembly 126 may be compared to the vertical using a suitable level. Conveniently, such adjustment does not rely on placing of shims or other objects behind the jamb.

Figure 7B:
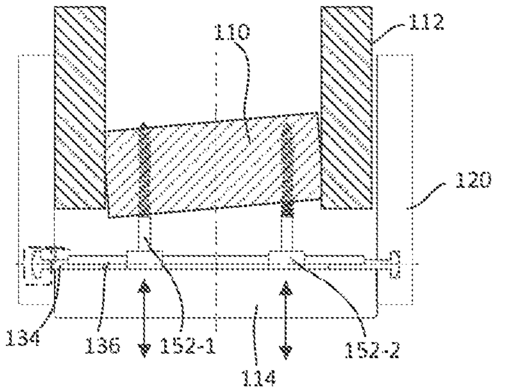
FIG. 7B is a cross-sectional view depicting adjustment of the door frame assembly of FIG. 2A.

FIG. 7B schematically depicts the use of brackets 136 to position jamb 114 square to the door opening. FIG. 7B is a top view of a jamb assembly 126 on a wall 102. As depicted, framing member 110 of wall 102 is twisted about its longitudinal axis. Accordingly, the framing member is skewed away from the orientation of door opening 104.

Bracket 136 has two fasteners 152-1, 152-2. Each one of the fasteners is adjustable relative to the framing member 110. That is, either one of fasteners 152-1, 152-2 may be driven farther into framing member 110 than the other. Accordingly, the orientation of jamb assembly 126 may be different than that of framing member 110. For example, as shown, fastener 152-2 is driven farther into framing member 110 than fastener 152-1. Such adjustment secures jamb assembly 126 such that an outer surface of jamb 114 is perpendicular to the plane of door opening 104.

Figure 8:
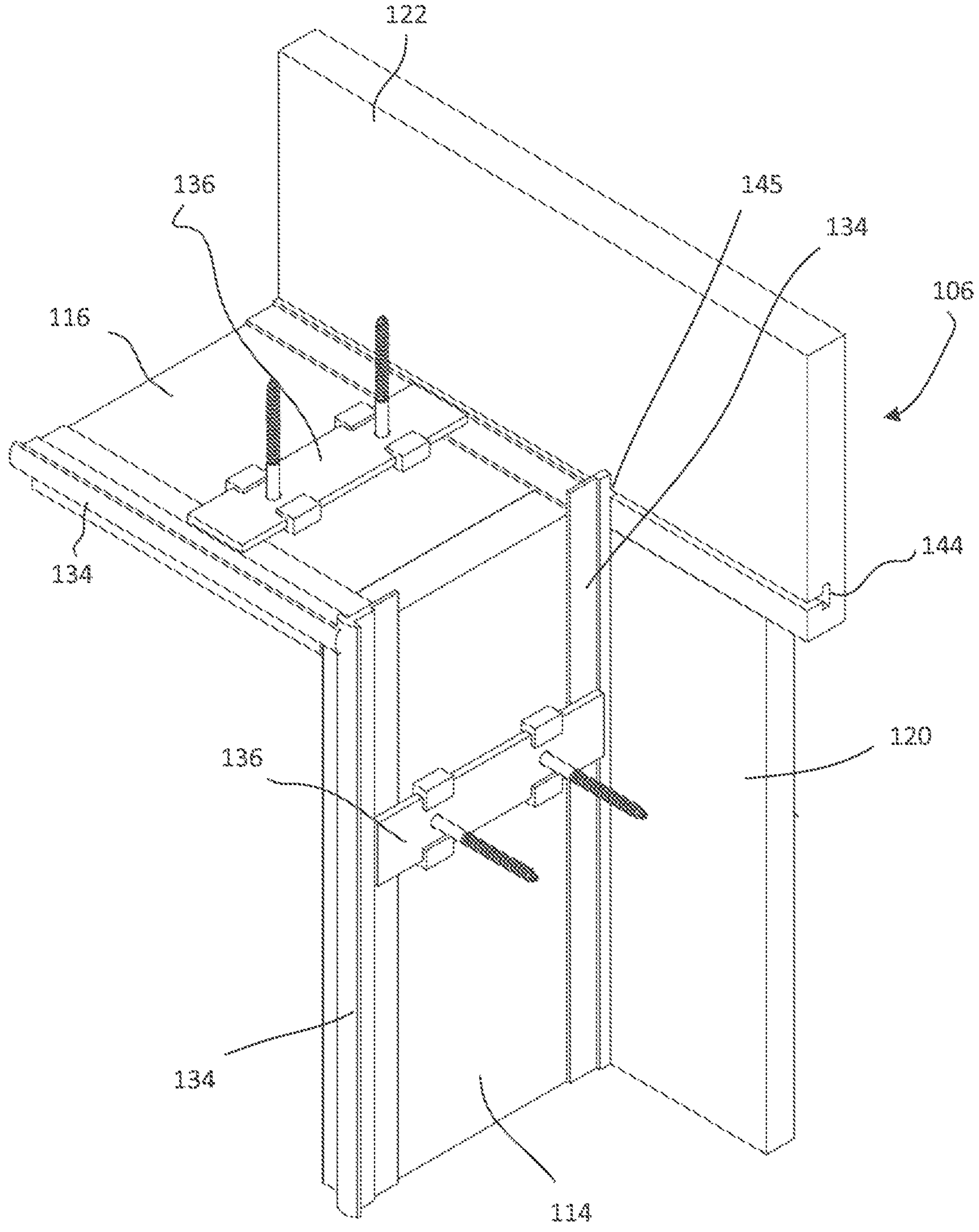
FIG. 8 is an enlarged isometric view showing a joint between a header section and a jamb section of the door frame assembly of FIG. 2A.

Jamb assemblies 126 and header assembly 128 may structurally interconnect with one another. FIG. 8 is an enlarged isometric view of a portion of door frame 106, showing details of such interconnection. One of trim pieces 122 and one of trim pieces 120 are omitted to show internal features.

As shown in FIG. 8, each of header 116 and trim pieces 122 cover the entire width of door frame 106 and extend across the top of jamb assembly 126. Jamb 114 is sized so that it tightly abuts header 116. Likewise, trim pieces 120 are sized so that trim pieces 120 tightly abut undersides of trim pieces 122. Posts 134 of jamb assembly 126 are longer than jamb 114 and trim pieces 120 and extend above the top edges of jamb 114 and trim pieces 120. Posts 134 of header assembly 128 are shorter than trim pieces 122 and span the distance between posts 134 of the two jamb assemblies 126. Thus, posts 134 of header assembly 128 abut posts 134 of jamb assembly 126.

Trim pieces 122 include slots 144 which are formed (e.g., routed) in trim pieces 122 and extend along the length of trim pieces 122. Slots 144 are sized to receive posts 134 of header assembly 128, such that insertion of the posts within slots 144 retains trim pieces 122 to brackets 136. Trim pieces 122 have an additional slot 145 proximate each end of the trim pieces.

Each slot 145 extends upwardly from a lower edge of trim piece 122. Accordingly, slots 145 are perpendicular to slot 144.

Slots 145 have a cross-sectional shape sized generally correspondingly to posts 134. When door frame 106 is assembled, posts 134 of jamb assemblies 126 are received in slots 145.

Engagement of posts 134 in slots 145 structurally ties the header assembly 128 to jamb assemblies 126. That is, header assembly 128 and jamb assemblies 126 are prevented from moving horizontally relative to one another. In addition, as is best shown in FIG. 2B, slots 145 maintain spacing of jamb assemblies 126 from one another. Specifically, slots 145 are spaced apart at a door width, d and hold jamb assemblies 126 apart at the same distance.

In embodiments, components of door frame 106 may be provided as a series of pre-fabricated components. For example, frames 130 including posts 134 and brackets 136 may be pre-assembled, and a trim piece 120 may be pre-installed to each one of posts 134. Similarly, frame 132 of header assembly 128 may be pre-assembled, along with its trim pieces 122. Fasteners 152, jambs 114 and header 116 may be installed at the time of installation of the door frame 106.

A worker may easily be able to install door frame 106 starting with such pre-assembled components. The design of such pre-assembled components allows for trim having straight edges and tight fit against wall 102. Conveniently, header assembly 126 and jamb assemblies 128 may be adjusted while trim is attached. Thus, pre-assembly may avoid the need for manual trim installation, but does not preclude adjustment of the door frame 106.

Figure 9:
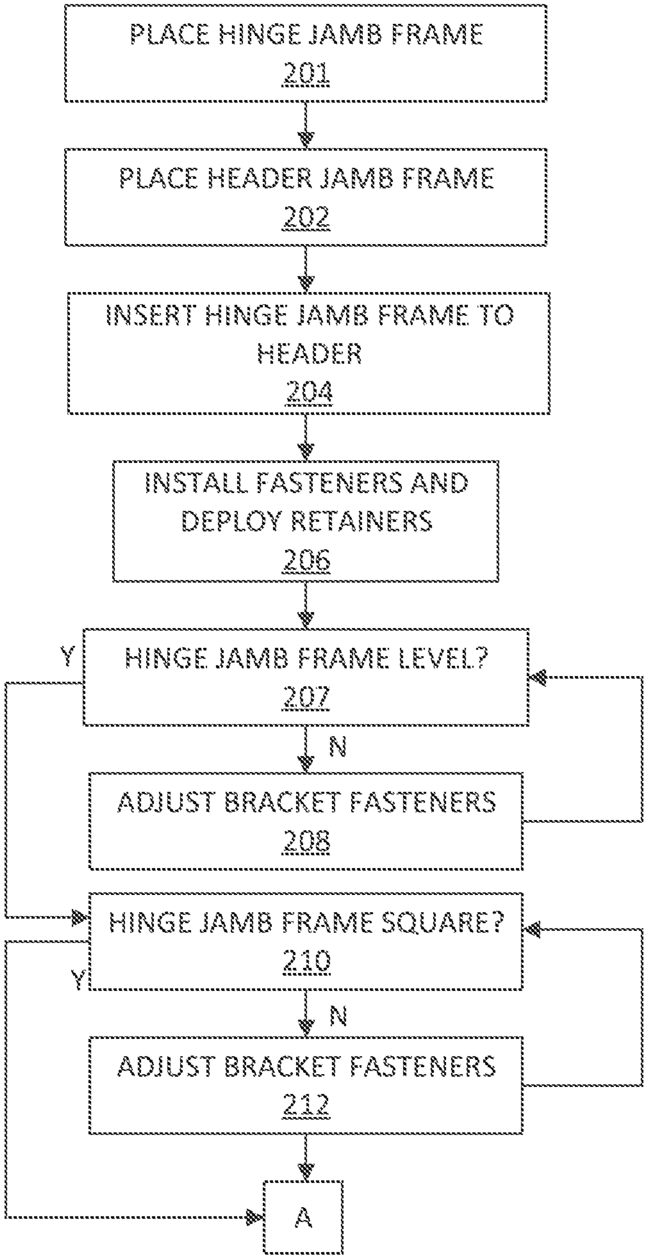
FIGS. 9-11 are flow charts depicting a method of door frame installation.
Figure 10:
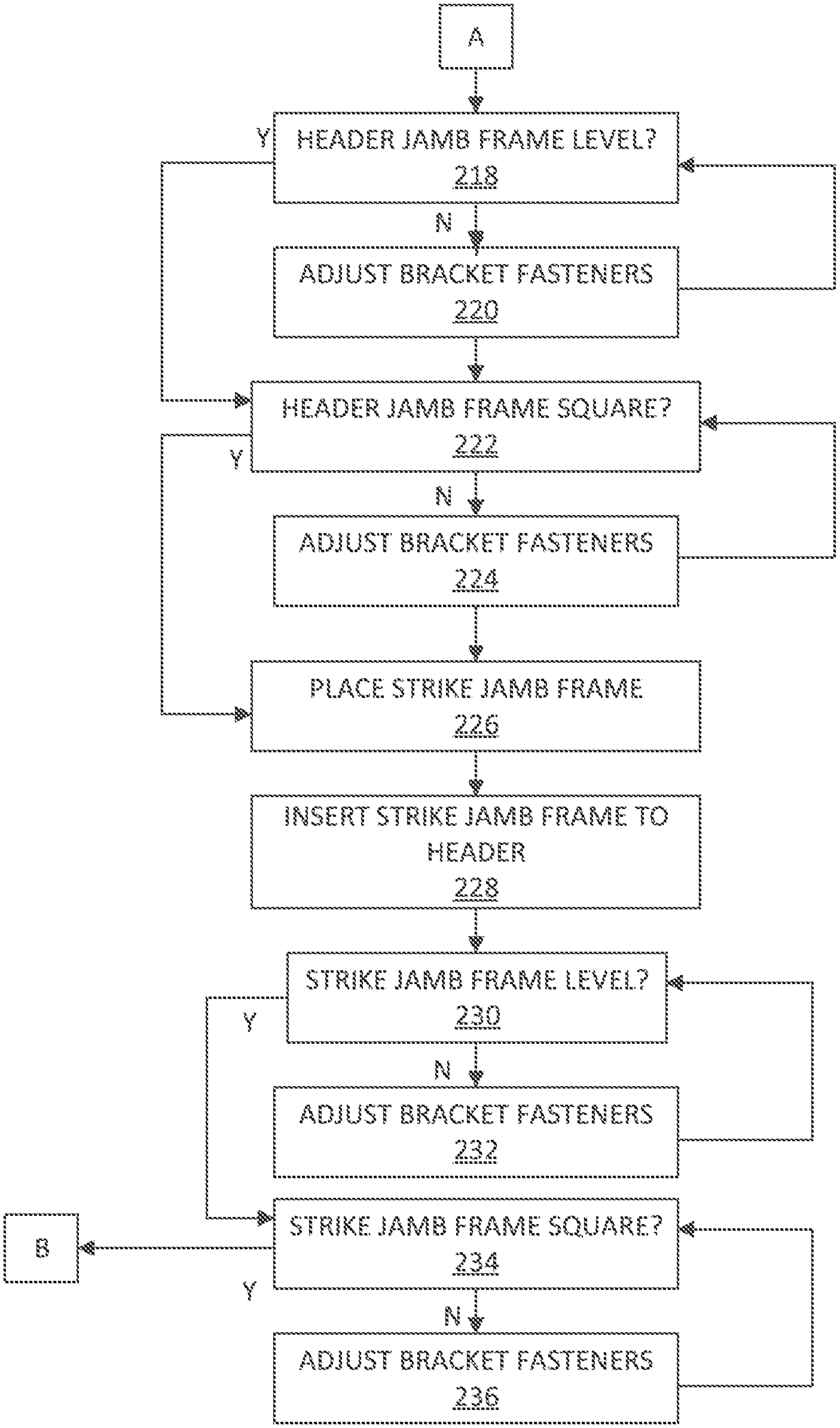
Figure 11:
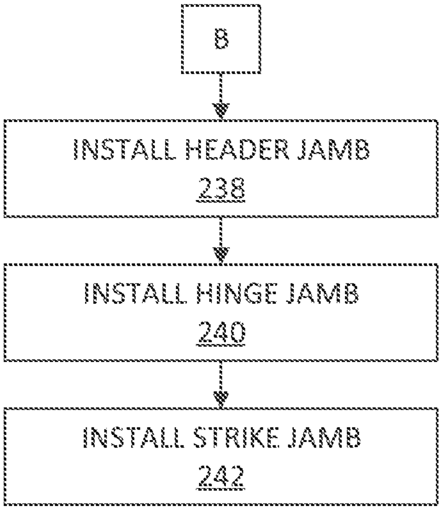

FIGS. 9-11 depict an example method 200 of installing a door. In the example method, installation begins with one jamb assembly 126, namely, the hinge jamb assembly, followed by header assembly 128, then the other jamb assembly 126, namely, the strike jamb assembly.

At block 201, hinge jamb frame 130 with trim pieces 120 is placed adjacent to framing member 110 along one length of rough opening 104.

At block 202, header frame 132 with trim pieces 122 is placed adjacent to framing member 110 across the top of rough opening 104.

At block 204, posts 134 of the hinge jamb frame 130 are inserted into slots 145 of the header frame assembly. Specifically, the posts 134 of hinge jamb frame 130 are aligned with slots 145 proximate one end of trim pieces 122. The hinge jamb frame 130 is slid upwardly so that the posts 134 are received in the slots 145.

Fasteners 152 are installed through each of brackets 136 and driven into the framing member 110 sufficiently to hold the hinge jamb frame 130, and trim pieces 120 in place. At block 206, retainers 156 are moved to their deployed positions atop the fasteners 152 to hold the fasteners captive between the retainers 152 and brackets 136.

At block 207, vertical level of the hinge jamb frame 130 is verified. That is, a level is used to verify that the hinge jamb frame 130 extends along a vertical axis.

If the hinge jamb frame 130 is not vertical, i.e. if part of the frame is too close to or too far from framing member 110, at block 208 an installer adjusts fasteners 152 of the hinge jamb frame assembly. Fasteners 152 are driven into framing member 110 to pull the brackets 136 and frame 130 closer to the framing member, or are withdrawn from the framing member to pull the brackets 136 and frame 130 away from the framing member.

After adjustment of fasteners 152, vertical level of hinge jamb frame 130 is again checked at block 207.

Once hinge jamb frame 130 is vertically level, squareness of the hinge jamb frame 130 is verified at block 210. For example, a square may be placed on a trim face to determine if the front and rear edges of the trims are square to each other. This measurement is repeated at the location of each bracket 136. If the frame is not square at the location of any bracket 136, the fasteners 152 are adjusted at block 212 to move the front or back edge of the frame 130 closer to or farther from the framing member 110.

After adjustment of fasteners, squareness is again checked at block 210.

Referring to FIG. 10, once hinge jamb frame 130 is both level and square, fasteners 152 are installed through each of brackets 136 and driven into the framing member 110 sufficiently to hold the header jamb frame 132 and trim pieces 122 in place. Horizontal level of header assembly 128 frame 132 is then verified at block 218. If the header assembly frame is not level, i.e. if it is not positioned along a horizontal axis, at block 220, the installer adjusts fasteners 152 of the header frame assembly. If a section of the header assembly 128 frame 132 is found to be too low, fasteners 152 in that section are driven farther into framing member 110, pulling brackets 136 and the header frame assembly 128 towards the framing member 110. Conversely, if a section of the header assembly 128 frame 132 is too high, fasteners 152 in that section are withdrawn from the framing member 110, pulling brackets 136 and the header frame assembly 128 away from the framing member.

After adjustment of fasteners, horizontal level is again checked at block 218.

Once frame 132 is horizontally level, squareness is checked at block 222. For example, a square may be placed on a trim face to determine if the front and back edges of the trims are square to each other. This measurement is repeated at the location of each bracket 136.

If the frame is not square at the location of any bracket 136, at block 224, the fasteners 152 at that bracket are adjusted. One or more of the fasteners 152 may be driven into framing member 110 to pull the front or rear edge of the frame 132 closer to the framing member 110. Additionally or alternatively, one or more of the fasteners 152 may be retracted from framing member 110 to pull the front or rear edge of frame 132 away from framing member 110.

After adjustment of fasteners, squareness is again checked at block 222.

At block 226, strike jamb frame 130 with trim pieces 120 is placed adjacent to framing member 110 along the other length of rough opening 104, opposite to hinge jamb frame 130.

At block 228, posts 134 of strike jamb frame 130 are inserted into slots 145 of the header frame 132 with trim pieces 122. Specifically, the posts 134 of strike jamb frame 130 are aligned with slots 145 proximate the other end of trim pieces 122. The strike jamb frame 130 is slid upwardly so that the posts 134 are received in the slots 145.

The vertical level of strike jamb frame 130 is verified at block 230. That is, a level is used to verify that the strike jamb frame 130 extends along a vertical axis. This may be checked with a level as described above. Additionally or alternatively, strike jamb 130 may be levelled relative to hinge jamb 130. For example, the width of the door opening between the hinge and strike jambs may be measured at a number of vertical positions. If the width is the same at all of the vertical positions, the hinge and strike jambs are parallel to one another, i.e. vertical.

As done for hinge jamb frame 130, if strike jamb frame 130 is not vertical, i.e. if part of the frame is too close to or too far from framing member 110, fasteners 152 of the strike jamb frame assembly are adjusted at block 232. Fasteners 152 are driven into framing member 110 to pull the brackets 136 and frame 130 closer to the framing member, or are withdrawn from the framing member to pull the brackets 136 and frame 130 away from the framing member.

After adjustment of fasteners 152, vertical level of strike jamb frame 130 is again checked at block 230.

Once strike jamb frame 130 is vertically level, squareness of strike jamb frame 130 is verified at the location of each bracket 136 at block 234. If the frame is not square at the location of any bracket 136, the fasteners 152 are adjusted at block 236 to move the front or back edge of the frame 130 closer to or farther from the framing member 110.

After adjustment of fasteners, squareness is again checked at block 234.

Once both jamb frames 130 and header frame 132 are level and square, header 116 is installed against header frame 132 at block 238. The header is inserted into the pocket 150 between trim pieces 122 and secured to frame 132, e.g., using fasteners or adhesive. Insertion of the header biases trim pieces 122 against wall 102 to minimize gaps between the wall and the trim pieces.

At blocks 240, 242, hinge and strike jambs 114 are installed against jamb frames 130. The jambs 114 are inserted in pockets 150 between trim pieces 120, and each jamb 114 is secured to the respective frame 130, e.g., using adhesive or fasteners. The trim pieces 120 are biased against wall 102 to minimize gaps between the wall 102 and trim pieces 120.

A door may then be mounted within the jambs.

As described above, retainers 156 are slidable along brackets 136 into their deployed positions. Other types of retainers are possible. For example, fasteners 152 may be received in recesses in brackets 136, and snap rings may be deployed by installation in such recesses after fasteners have been inserted. Such snap rings may have an internal diameter small enough to prevent retraction of fasteners 152, and large enough to permit manipulation of the fasteners while the snap rings are deployed.

As described above, frames 130, 132 include posts 134 that extend along substantially the entire length of the respective jamb assembly 126 or header assembly 128. In other embodiments, posts may be shorter. Additionally or alternatively, posts may be formed in multiple sections.

Figure 12B:
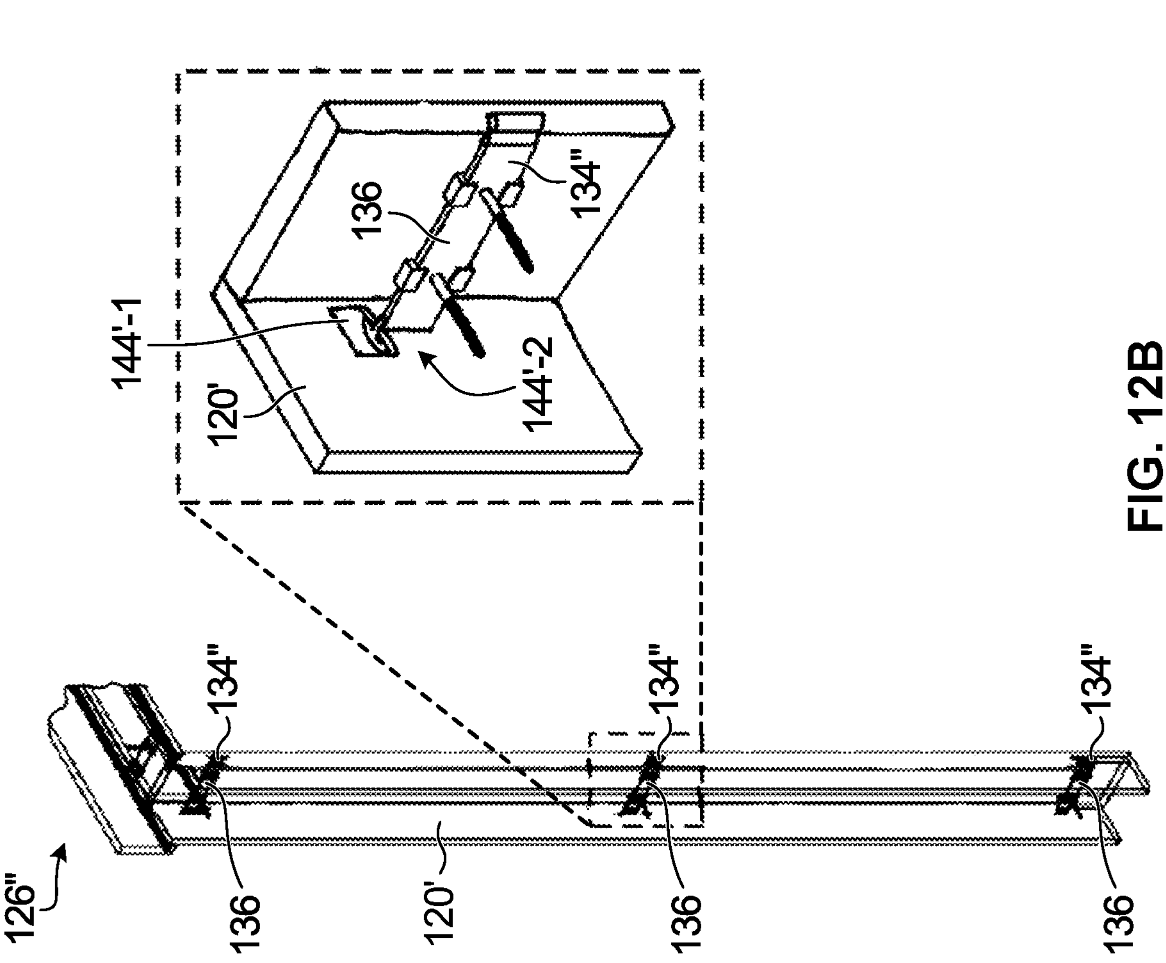
FIG. 12B depicts a jamb assembly, with a portion enlarged to show structural detail.
Figure 12A:
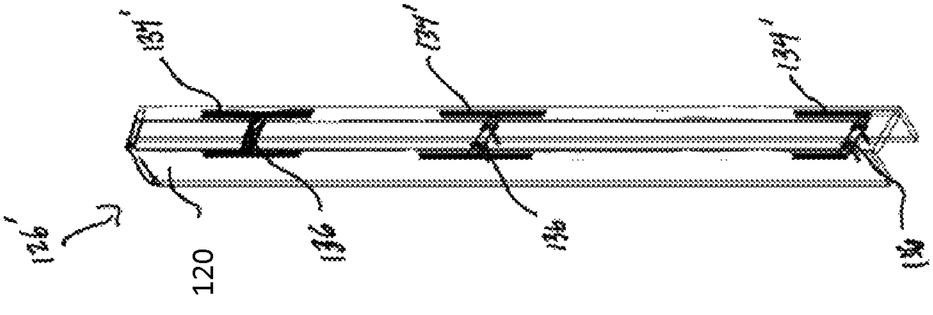
FIG. 12A depicts a jamb assembly.

For example, FIG. 12A depicts a jamb assembly 126'. Jamb assembly 126' is identical to jamb assembly 126, except that is has posts 134' formed in three discrete sections along the length of the jamb assembly. Each section comprises a pair of opposed posts extending along a portion of the length of jamb assembly 126'.

In some embodiments, the posts may project horizontally from brackets 136 and may not project along the length of the jamb or header frame. For example, FIG. 12B depicts a jamb assembly 126" which is identical to jamb assembly 126, except that it has posts 134" which extend only horizontally from brackets 136, and trims 120' with a plurality of corresponding slots 144' configured for insertion of posts 134". Slots 144' have an insertion section 144'-1 with an opening large enough to horizontally receive a post, and a retention section 144'-2 defined as a T-shaped slot. Posts 134" may be inserted into insertion section 144'-1 and slid along the length of trim 120' into retention section 144'-2 to hold the trim 120' and post 134" together. In some embodiments, the brackets 136 may be coupled to a common reinforcing member (not shown). The reinforcing member may extend along the length of the jamb assembly such that the brackets and reinforcing member cooperatively define a supporting surface for the jamb 114. The brackets and reinforcing member may be integrally formed, or may be suitably fastened together, e.g. using fasteners, welding or the like.

In some embodiments, brackets 136 and posts 134 may be integrally formed with one another as a single structure, e.g. by injection molding or casting.

Jamb assemblies 126', 126" may be relatively easy to assemble. That is, posts 134', 134" may be relatively easy to insert to the respective trim. However, posts which extend along a longer portion of the assembly, as in jamb assemblies 126, may provide additional structural stability.

Figure 13:
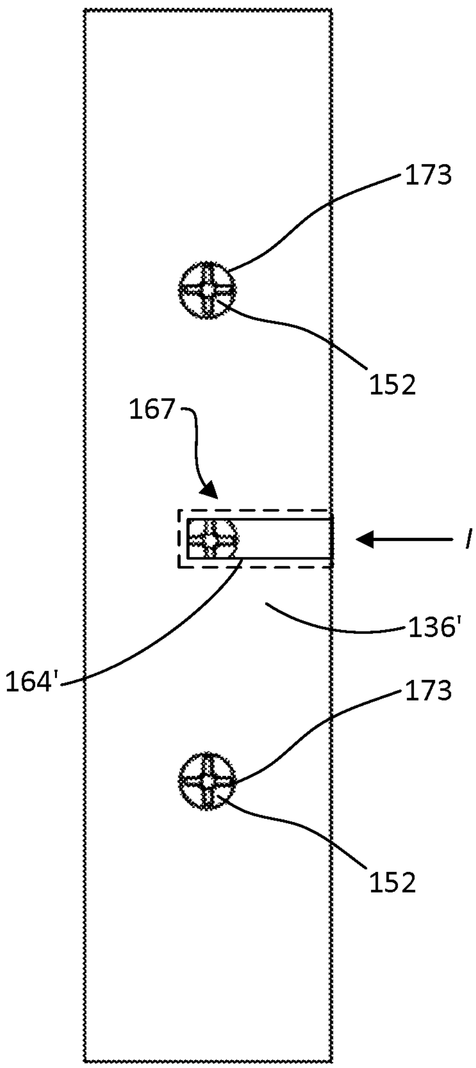
FIG. 13 is an enlarged front view of a bracket assembly.
Figure 14:
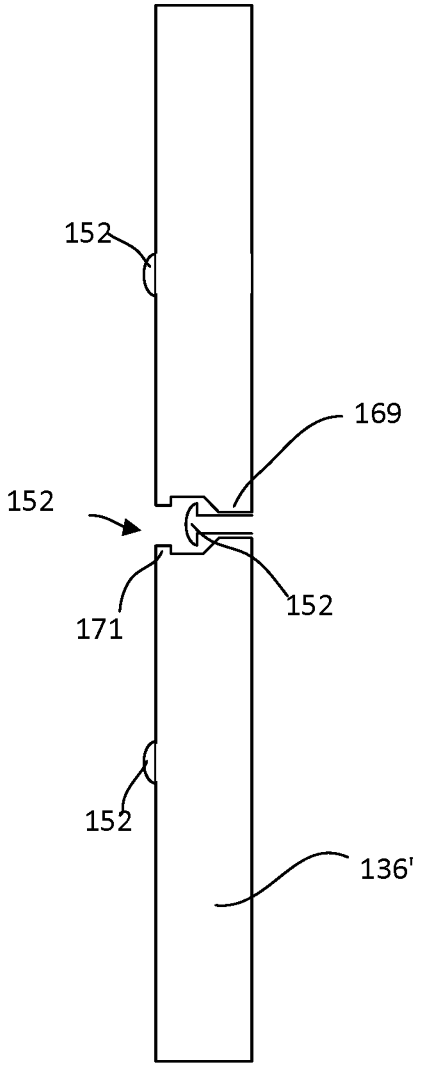
FIG. 14 is a top view of a bracket, retainer and fastener of the bracket assembly of FIG. 13.

In some embodiments, fasteners may be retained to brackets by structures formed integrally with the brackets. FIGS. 13-14 depict an example of such a bracket 136'. FIG. 13 shows a front view of bracket 136' and FIG. 14 depicts a top view of bracket 136'.

Bracket 136' includes a pocket 167 extending inwardly from an edge of the bracket. Pocket 167 is sized to receive the head of a fastener 152 inserted transversely to the fastener's axis in the direction indicated by arrow I. Pocket 167 has a first flange 169 positioned behind the head of fastener 152, i.e. between the head and the substrate to which the bracket 136' is secured. Flange 169 defines an opening large enough to receive the shaft of fastener 152, but smaller than the head of fastener 152. Pocket 167 also has a second flange 171 positioned so that the head of fastener 152 is received between flanges 169, 171. The second flange 171 defines an adjustment slot 164' sized to permit access to fastener 152 by a tool (e.g. a screwdriver), but to prevent fastener 152 from being withdrawn from pocket 167.

When a fastener 152 is received in pocket 167, the fastener is captive between flanges 169, 171. Bracket 136' may be moved toward or away from an underlying frame member by adjustment of the fastener 152. Specifically, driving fastener 152 into the frame member causes the fastener to bear against flange 169, pulling the bracket 136' toward the frame member. Conversely, withdrawal of the fastener 152 from the frame member causes the fastener to bear against flange 171, pulling the bracket away from the frame member.

Bracket 136' also has auxiliary fastener holes 173 on both sides of pocket 167. Additional fasteners 152 can be received in auxiliary fastener holes and driven into an underlying frame member to secure the bracket 136' and to adjust the position of the bracket 136'. Specifically, driving the fasteners 152 through auxiliary fastener holes 173 can cause the bracket to twist around pocket 167 and its fastener.

Figure 15A:
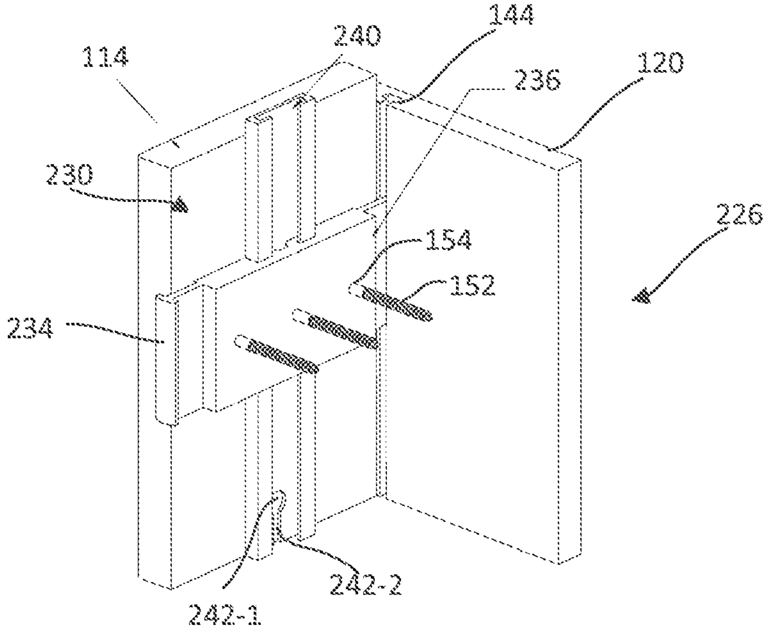
FIGS. 15A, 15B and 15C are isometric, top and rear views, respectively, of a jamb assembly.
Figure 15B:
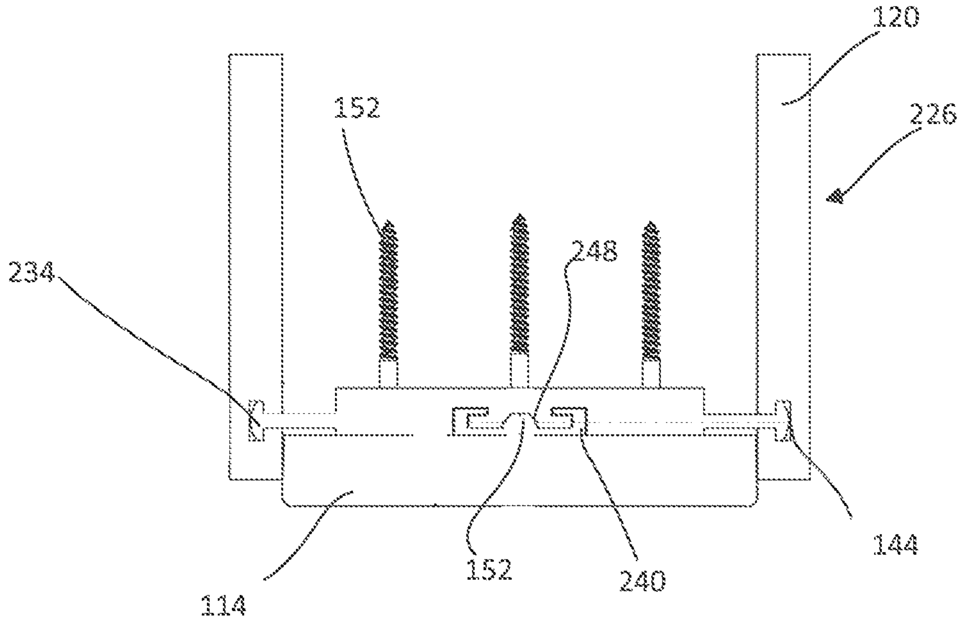
Figure 15C:
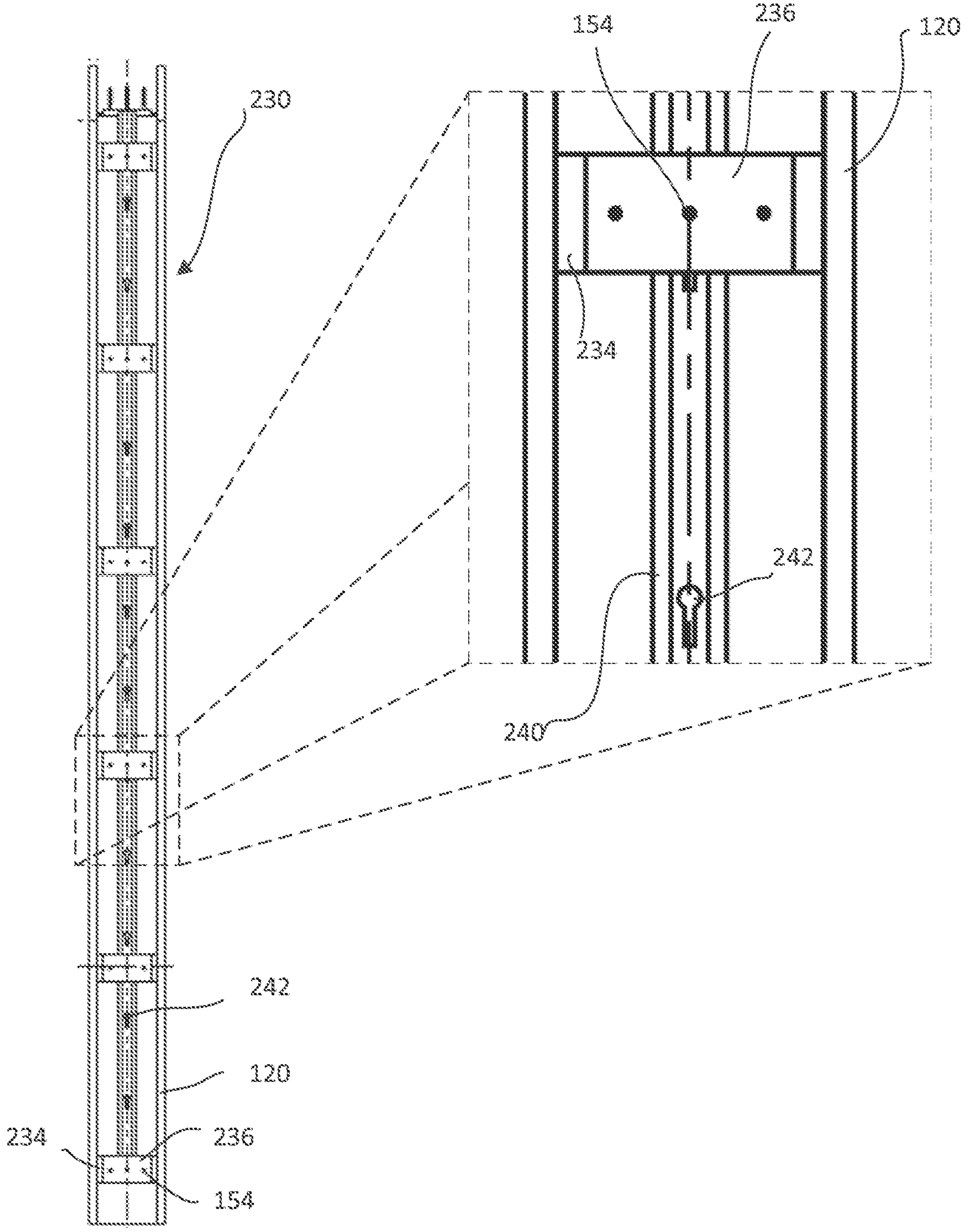
Figure 16:
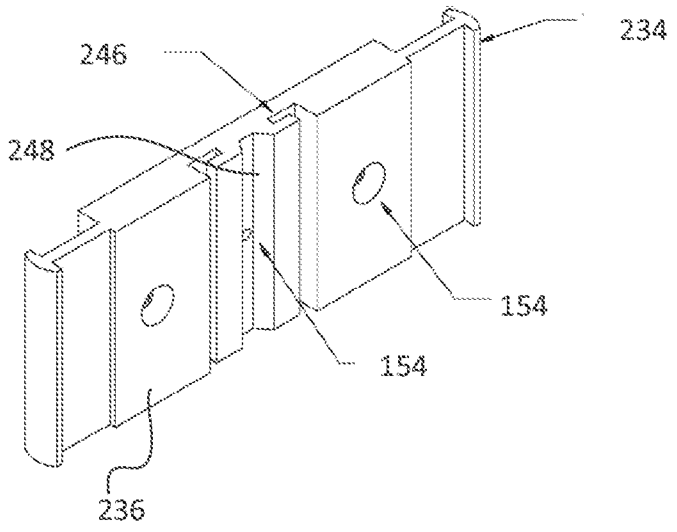
FIG. 16 is an isometric view of a bracket of the jamb assembly of FIGS. 15A-15C.

In some embodiments, a single retainer may be provided to retain fasteners at multiple brackets. FIGS. 15A-15C, 16 and 17 depict one such example jamb assembly 226. FIGS. 15A, 15B and 15C are isometric, top and rear views, respectively, of jamb assembly 226. FIG. 16 is an isometric view of a bracket of the assembly. Although a jamb assembly is depicted, header assemblies of the same construction may also be included.

Jamb assembly 226 includes a strike jamb or hinge jamb 114, and two opposing pieces of casing trim 120. One piece of trim 120 is omitted in FIG. 15A to show details of the assembly. Trim 120 and jamb 114 are mounted to a frame 230 defined by brackets 236 and a retainer bar 240. As depicted, the frame 230 includes a plurality of brackets 236, each with integrally-formed flanged ends 234. The flanged ends 234 have cross-sectional profile substantially identical to that of posts 134 described above, and are received in slots 144 to retain trim pieces 120 as described above. Alternatively, brackets 236 may have separate posts 134 attached (e.g. welded or fastened) thereto.

In some embodiments, the flanged ends of brackets may extend along the height of trim pieces 120. Such extended flanged ends may allow for a stable frame 230 with fewer brackets.

Fasteners 152 are inserted through holes 154 in brackets 236 for securing the jamb assembly 236 to the rough opening of a doorway. In the depicted embodiment, a central fastener is provided, along with two lateral fasteners.

A retainer bar 240 is positioned between the brackets 236 and jamb 114 and extends along the height of the jamb, or a substantial portion thereof. Retainer bar 240 is secured to brackets 236 and retains at least one fastener 152 to each bracket 236 (as depicted, central fastener 152).

Retainer bar 240 has a plurality of mounting keyholes 242 along its length. Each mounting keyhole has a large round opening 242-1 sized to receive the head of a fastener 152 therethrough. Each mounting keyhole also has a narrow slot 242-2 extending from the round opening. The narrow slot is sufficiently wide to permit access to a fastener by a tool such as a drill screwdriver bit or screwdriver, but is smaller than the head of a fastener, such that it prevents the fastener from being withdrawn through the slot.

Retainer bar 240 may fit flush with and interlock with brackets 236. Specifically, as depicted, retainer bar defines a c-shaped channel in cross-section. The channel interlocks with a corresponding slot 246 in the bracket. That is, the slot 246 is complementary to the cross-section of retainer bar 240 such that the retainer bar can be inserted in the slot with the bracket 236 and retainer bar 240 are slidable relative to one another. The retainer bar 240 and brackets 236 cooperate to define a flush surface facing away from rough opening 104 for abutting a jamb 114.

In the depicted embodiment, bracket 236 has a beveled recess 248 corresponding to the head of a countersunk fastener 152, such that the fastener can be inserted and sit flush with bracket 236 against retainer bar 240.

As depicted in FIG. 15C, retainer bar 240 extends along the height of the jamb and of frame 230. Brackets 236 may be mounted to retainer bar 240 and between trim pieces 120. That is, each bracket may be placed with its flanged ends 234 received in slots 144 of the trim pieces 120 and with the retainer bar 240 received in the bracket's slot 246. Brackets 236 may then be positioned in a desired position (e.g. at desired vertical spacing intervals), with round openings 242-1 of keyholes 242 aligned with fastener holes 154 in the brackets. Fasteners may then be inserted through the openings and the brackets 236. The retaining bar 240 may then be deployed, i.e. the bar may be slid relative to one another so that the narrow flows 242-2 of keyholes 242 are positioned over fasteners 152 to cover the fasteners 152 and holes 154, thereby holding the fasteners 152 in place between the brackets 236 and retainer bar 240. In the depicted embodiment, retainer bar 240 is held in place and brackets 236 are slid relative to the retainer bar. Alternatively, the brackets may be held in place and the retainer bar may be slid. As depicted, the retainer bar holds only the central fastener 152 of each bracket. However, the retainer bar may additionally or alternatively hold other fasteners, e.g. lateral fasteners. Jamb assembly 236 may then be vertically leveled and squared, and a jamb installed as described above. Thus, the retainer bar 240 acts as a retainer for multiple brackets. That is, the retainer bar may be deployed by sliding the brackets into position such that the retainer bar retains fasteners at a plurality of brackets. In some embodiments, brackets 236, retainer bar 240 and trim pieces 120 may be assembled together as a unit, which may then be aligned with and installed at the rough opening 104. Fasteners may then be installed and leveling and squaring performed.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

The term "comprise", including any variation thereof, is intended to be open-ended and means "include, but not limited to," unless otherwise specifically indicated to the contrary.

When a set of possibilities or list of items is given herein with an "or" before the last item, any one of the listed items or any suitable combination of two or more of the listed items may be selected and used.

The above described embodiments are intended to be illustrative only. Modifications are possible, such as modifications of form, arrangement of parts, details and order of operation. The examples detailed herein are not intended to be limiting of the invention. Rather, the invention is defined by the claims.

What is claimed is:

1. A door framing assembly for installation to a rough door opening in a wall, comprising:

- a plurality of trim pieces for overlying said wall to conceal edges of said rough opening;
- a frame comprising:
  - a plurality of brackets positioned along an axis of said trim pieces and holding said trim pieces in opposed, spaced apart relationship defining a pocket for reception of a jamb, said each of said brackets having a hole sized for receiving a shaft of a fastener;
  - flanges received in corresponding slots of said trim pieces, such that each of said trim pieces is retained to said frame and pivotable around said flanges toward said wall;
  - a retainer to cover said hole of a bracket to hold a head of a fastener captive between the bracket and the retainer such that said bracket can be pulled toward an edge of said rough opening by driving said fastener into said wall or pulled away from an edge of said rough opening by retracting said fastener from said wall, to level said door assembly.

2. The door framing assembly of claim 1, wherein said frame further comprises a pair of axially-extending posts, and said flanges are part of said posts.

3. The door framing assembly of claim 2, wherein said posts extend along a length of said trim pieces.

4. The door framing assembly, of claim 1 wherein said flanges are slidable in said slots along a length of said trim pieces.

5. The door framing assembly of claim 1, comprising a jamb sized for an interference fit in said pocket between said trim pieces, such that said jamb urges said trim pieces to pivot toward said wall.

6. The door framing assembly of claim 5, wherein said jamb is tapered for insertion between said trim pieces.

7. The door framing assembly of claim 1, wherein said retainer extends along at least part of the length of the assembly and is positioned against a plurality of said brackets.

8. The door framing assembly of claim 7, wherein said retainer has a cross-sectional shape that slidably interlocks with said brackets.

9. The door framing assembly of claim 8, comprising a plurality of holes for installation of fasteners, each said hole having a first portion sufficiently wide to receive a head of a fastener therethrough, and a second portion sufficiently narrow to prevent passage of said head of said fastener, to retain said fastener between said retainer and a bracket.

10. The door framing assembly of claim 8, wherein said retainer and said brackets define a flush surface for abutting a jamb.

11. The door framing assembly of claim 10, wherein each said bracket comprises a recess for receiving a countersunk fastener.

12. The door framing assembly of claim 1, comprising a plurality of retainers, each slidable along a corresponding one of said brackets between a deployed position covering said holes, and a retracted position away from said holes.

13. The door framing assembly of claim 12, wherein each of said retainers has a tool hole sized to permit access to said fasteners by a driving tool, and to prevent retraction of said fasteners through said tool hole while in said deployed position.

14. The door framing assembly of claim 1, comprising a header section and a jamb section, each having a frame.

15. The door framing assembly of claim 14, wherein said header section comprises a trim piece with a slot to receive a frame of said jamb section.

16. The door framing assembly of claim 1, wherein each of said brackets comprises a plurality of horizontally-offset holes for receiving a plurality of fasteners, wherein said plurality of fasteners can be driven into or retracted from said wall to square said brackets.

* * * * *